Figure 1:
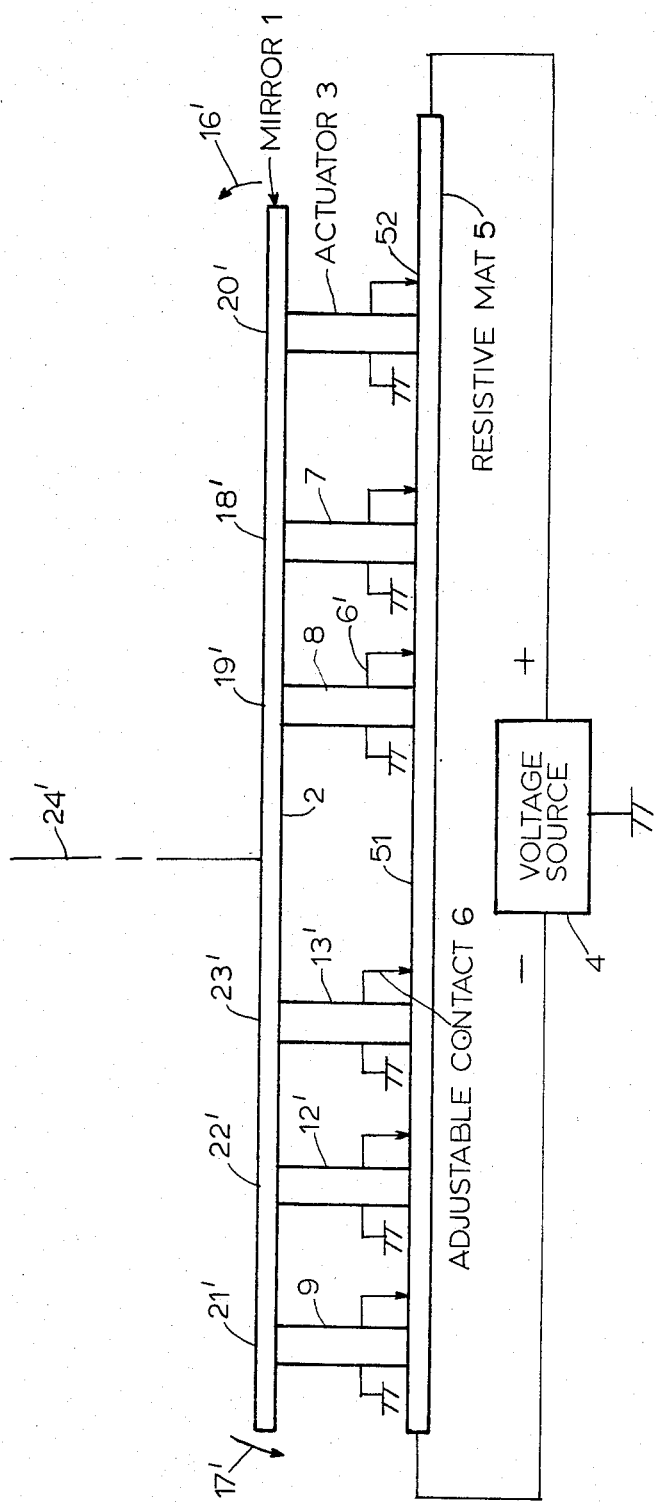

United States Patent [19]

Aldrich

[11] Patent Number: 4,533,219

[45] Date of Patent: Aug. 6, 1985

[54] TIP-TILT MIRROR ACTUATION SYSTEM EMPLOYING A SINGLE CONTROL VOLTAGE

[75] Inventor: Ralph E. Aldrich, Acton, Mass.

[73] Assignee: Itek Corporation, Lexington, Mass.

[21] Appl. No.: 589,378

[22] Filed: Mar. 14, 1984

[51] Int. Cl.³ .............................................. G02B 7/18
[52] U.S. Cl. ................... 350/487; 350/632; 310/328; 310/317
[58] Field of Search ............... 350/487, 486, 632, 636, 350/637, 611, 6.6

[56] References Cited

U.S. PATENT DOCUMENTS

| | | | |
|---|---|---|---|
| 1,438,974 | 12/1922 | Wente | 350/487 |
| 3,544,202 | 12/1970 | Fowler | 350/487 |

FOREIGN PATENT DOCUMENTS

| | | | |
|---|---|---|---|
| 252387 | 2/1926 | United Kingdom | 350/6.6 |
| 654927 | 3/1979 | U.S.S.R. | 350/486 |
| 651296 | 3/1979 | U.S.S.R. | 350/487 |

Primary Examiner—Jon W. Henry
Attorney, Agent, or Firm—Michael H. Wallach; Robert F. Rotella

[57] ABSTRACT

An array of electromechanical actuators are positioned beneath a movable mirror and have movable contacts which are affixed to the upper surface of a resistive mat having a single voltage gradient applied across the mat to control the tilting of the mirror. The adjustability of the contact points of each actuator enables the use of actuators which have a substantially varying sensitivity with respect to the application of particular voltages.

14 Claims, 2 Drawing Figures

FIG. I.

TIP-TILT MIRROR ACTUATION SYSTEM EMPLOYING A SINGLE CONTROL VOLTAGE

BACKGROUND OF THE INVENTION

The present invention relates to the field of control systems for actuating optical elements.

Electrically controlled movable optical elements such as tip-tilt mirrors are often employed for telescopic tracking or viewing of various objects. In accordance with the prior art, a substantial plurality of mirror actuators are affixed to one side of a mirror to be pointed in various directions. The actuators move the mirror by different amounts so that the mirror as a whole points in a given selected direction, and such amounts are proportional to electrical control signals applied to the input circuits of the actuators. Since there are often many actuators affixed to the movable mirror, numerous different control voltages are individually applied to the actuators to cause a given selected mirror orientation. This means that a large number of control voltages which differ from one another must be individually generated.

SUMMARY OF THE INVENTION

It is an object of the present invention to eliminate the application of a large number of control voltages which generally differ from one another and are applied individually by driver amplifiers to the actuators, thereby to simplify the electrical control circuitry. It is a further object of the invention to eliminate the necessity for a substantial number of such driver amplifiers.

It is a further object of the present invention to automatically compensate for variations in the responsiveness or sensitivity of individual actuators; thus actuators which have a different degree of responsiveness to a particular voltage may be readily employed in a mirror actuation system without detrimental effect, in contrast with the prior art.

In accordance with a preferred embodiment of the invention, a two dimensional resistive mat has a single but variable control voltage gradient applied thereto for controlling the motion of all actuators in the two dimensional actuator array. Each actuator is electrically coupled to the surface of the resistive mat by an adjustable contact means. The appropriate response of each actuator is established by testing a number of given points with the adjustable contact until a particular point is found for each actuator, which results in the appropriate responsiveness of each actuator with respect to the single control voltage gradient applied across the mat.

Figure 2:
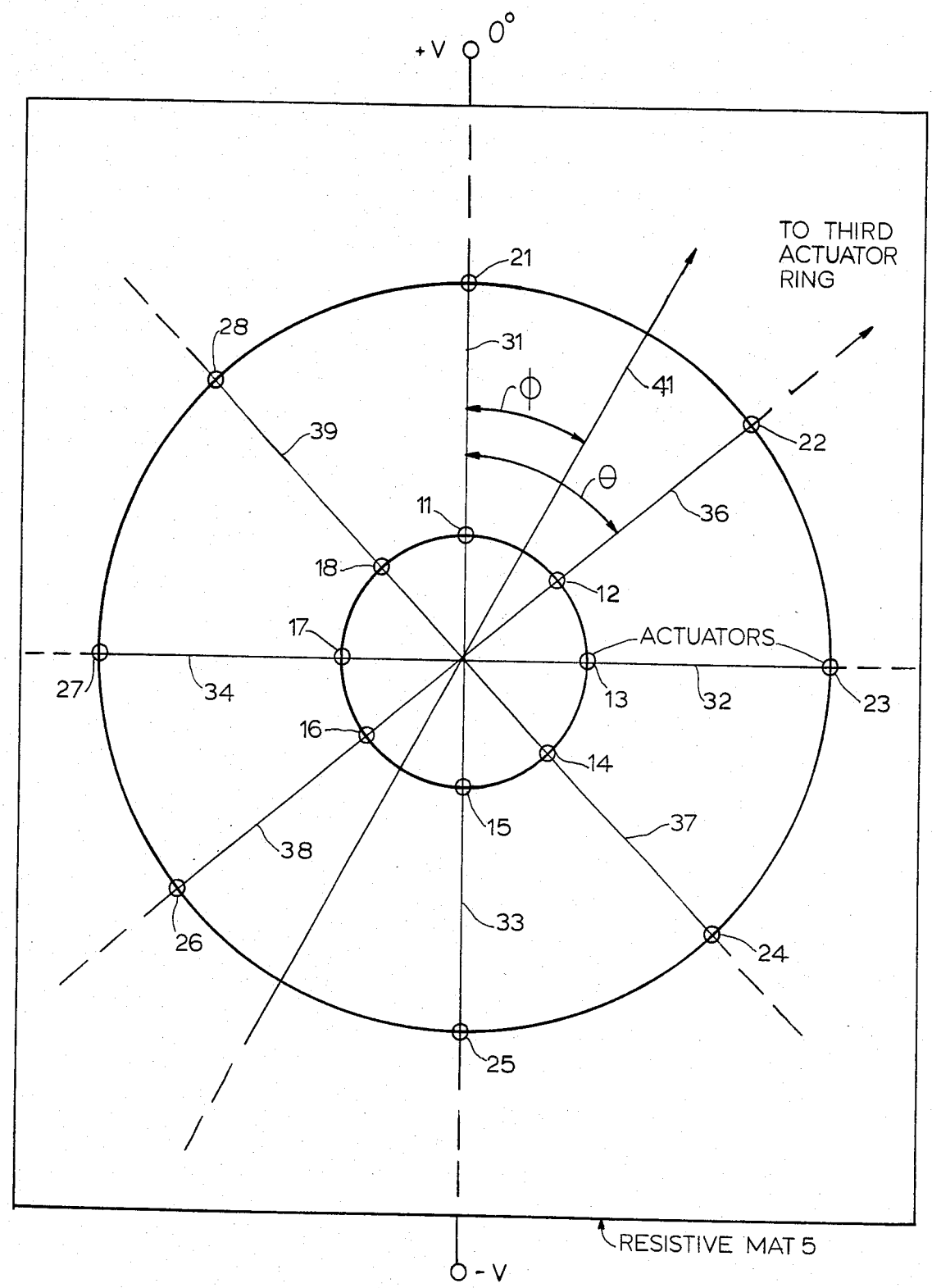

Other objects, features and advantages of the present invention will become apparent upon study of the following description taken in conjunction with the drawings in which:

FIGS. 1 and 2 illustrate a preferred embodiment of the invention.

SPECIFIC DESCRIPTION

Referring now to FIG. 1, a movable mirror 1 is schematically illustrated, having a lower surface 2 affixed to six electro-mechanical actuators 3, 7, 8, 9, 12', and 13'. Each actuator could comprise a plurality of piezo-electric layers, separated by electrodes which produce expansion or contraction of the layers depending upon the applied voltage polarity, as is well known to those skilled in the art. Let it be assumed that it is desirable to tip movable mirror 1 in a counterclockwise direction as indicated by arrows 16' and 17'. Under these circumstances, the right hand portion 20' of movable mirror 1, would be displaced upwardly to a greater extent relative to mirror portion 18'. In like manner, mirror portion 19' would be displaced by an appropriate lesser amount in order to cause the mirror to change its axial direction without bending, which generates detrimental internal stress. In like manner, mirror portion 21' at the extreme left hand portion of FIG. 1 would be moved downwardly as indicated by arrow 17' to an extent greater than mirror portions 22' and 23'.

In accordance with the invention, the inherent sensitivity or responsiveness of an individual actuator to a given applied voltage value could be the same, or surprisingly could differ substantially, with respect to the responsiveness of the other actuators without adversely affecting operation of the system by inducing bending stresses in the mirror. This is due to the provision of a two dimensional impedance device, preferably a resistive mat 5 and adjustable actuator input terminal contacts 6, which function as explained later in greater detail. These contacts further eliminate the need to apply a plurality of precise different control voltages to individual actuators.

While a single line of actuators such as illustrated in FIG. 1 may be employed to tip the mirror back and forth only about a single axis, generally rings of actuators of FIG. 2 are positioned beneath the mirror, such actuators having upper surfaces thereof affixed to the lower mirror surface as in FIG. 1, so that the mirror axis 24' may be pointed in any direction. Thus, actuators 11 and 21 are positioned on radial line 31, actuators 13 and 23 are positioned along radial line 32, actuators 15 and 25 are positioned along radial line 33, and actuators 17 and 27 are positioned along radial line 34. In like manner actuators 12 and 22 are positioned along radial line 36, actuators 14 and 24 are positioned along radial line 37, actuators 16 and 26 are positioned along radial line 38 and actuators 18 and 28 are positioned along radial line 39. Accordingly, the actuators in the first or inner ring are assigned the tens digit 1, whereas the actuators in the second ring are assigned the tens digit 2, and the units digit, such as 1 in actuator 21 indicates that the actuator is in the first group extending along radial line 31 along with actuator 11. In like manner radial line 37, for example, intersects actuators 14 and 24 which form the fourth group. In the illustrated example of FIG. 2, eight actuators are positioned within each ring illustrated; a third ring of eight actuators could also be employed. Thus the three actuators, 3, 7 and 8 of FIG. 1, would be positioned along a particular radial line, whereas actuators 9, 12' and 13' would be positioned along a second radial line in 180° opposition to the first radial line.

The actuator arrangement in FIG. 2 illustrates a prior art configuration of an array of actuators. Only two rings have been illustrated in the interest of simplicity and will suffice to support an appropriate explanation of the nature of the array. In accordance with known prior art techniques, let it be assumed that it is desirable to tip the mirror in and out of the plane of FIG. 2 and to rotate about horizontal radial line 32. A positive going control signal would be applied to actuator 11 having a given value, whereas an appropriately larger control voltage would be applied to actuator 21 so as to move the mirror portion at 21 to a greater extent relative to that portion of the mirror affixed to actuator 11. In like manner, actuator 15 would cause an opposite displacement of the mirror portion adjacent 15, and actuator 25 would cause an even greater displacement of the portion adjacent 25 in an opposite direction, so that four different control voltages would be applied to the four transducers for actuators 11, 21, 15 and 25. In accordance with the present invention, the four individually applied control voltages are reduced in number by applying a single control voltage differential across resistive mat 5. Should a third, fourth and fifth actuator ring be employed, greater economies are realized since all of the actuators along the radial lines 31 and 33 for example, would respond to the single control voltage differential. The dual polarity aspect discussed before, enables the push-pull operation of the optical element in one direction or the other depending upon the voltage polarity applied across the mat, whereas the degree of change in direction is a function of the magnitude of this voltage.

While the nature of the control voltages applied to the various actuators in the rings do not directly involve the present invention, the following prior art material is presented in order to give the reader further background.

For the maximum rotation of the mirror about the horizontal radial lines 32 and 34, the maximum voltage would be applied to the outermost actuators and lesser voltages would be applied to those actuators closer and closer to the central mirror portions. For lesser amounts of rotation, lesser voltages would of course be applied. In the special case of rotation about horizontal radial lines 32 and 34, no voltages would be applied to actuators 13, 23, 17 and 27, whereas reduced voltages would be applied to the intermediate actuators 22, 28, 24 and 26. The maximum voltage $V_o$ is defined as equal to the maximum deflection called for divided by the sensitivity or responsiveness of the edge actuator, in microns of displacement/volt. In the special case of rotation about the horizontal radial lines 32 and 34, $V_{21}$ ($V_o$) could for example equal plus 100 volts and the voltage applied to actuator 11 would be that reduced voltage appropriate to move the mirror without tending to induce bending stresses therein. In like manner, the voltage applied to actuator 25 could be minus 100 volts to effect a complimentary opposite displacement, whereas the voltage applied to actuator 15 would be the aforesaid reduced voltage with a negative value. To effect this particular rotation about the horizontal radial lines 32 and 34, $V_{22}$ and $V_{28}$ would be, for example, positive and equal to $V_{21} \cos$ theta (assuming all radial lines are angularly displaced from each other by equal angles) whereas $V_{24}$ and $V_{26}$ would be equal to $V_{25} \cos$ theta and would of course be negative. In the specific case of rotation of the mirror in and out of the plane of FIG. 2 and about vertical radial lines 31 and 33, the voltage pattern would be rotated 90°, such that the voltages previously applied to actuators 11 and 21 would now be applied to actuators 13 and 23 and so forth.

In the general case, rotation for a given positional command could be about some axis perpendicular to line 41, for example, displaced angularly from line 31 by some angle phi shown in FIG. 2.

The maximum voltage for maximum mirror displacement to be applied to actuator 22, instead of being $V_o \cos$ theta for rotation about 32 and 34, would now be $+V_o \cos$ (theta-phi); the maximum voltage applied to actuator 23 would be $V_o \cos$ (2 theta-phi) and so on. This voltage for the general case equals $V_o \cos$ (n theta-phi) where n is the number of the radial line starting with 36, and theta is the angular separation between radial lines.

Let it be assumed that voltage source 4 produces a positive 100 volt potential at the right hand edge of resistive mat 5 and a negative 100 volt potential at the left hand edge of resistive mat 5. With this connection, it should be apparent that a voltage gradient will be produced along the length of the mat such that for example, central point 51 will have a potential of 0 volts with respect to ground. In accordance with the above mentioned teachings of the prior art, the appropriate voltage to be applied to each actuator, as discussed herein before, is "picked off" of the surface of the resistive mat, so that for a given voltage applied across the mat, the appropriate responsiveness of each actuator is attainable. The actuators would be placed in the approximate positions estimated in accordance with the above prior art teachings and the adjustable contact of each actuator is positioned upon various points on the surface of the mat until a particular point is located to produce an appropriate response to each actuator with respect to the application of a given control voltage across the mat. When the particular point is located, the adjustable contact is permanently affixed to the surface of the resistive mat.

It may be shown that the voltage at any particular point x along the length of the mat may be given by the formula $V_x$ equal V minus 2Vx/X where x is equal to the distance from the right hand edge of the mat to the particular point. Thus if x equals 0, at the right hand edge, the voltage is plus V, if the left hand edge of the mat is examined, x equals X and the resulting voltage is minus V. If x is one half of X, $V_x$ equals 0 at the central portion of the mat. Accordingly any applied actuator voltage may be selected by moving the contact point along x.

Now let it be assumed the right hand actuator 3 in FIG. 1 is somewhat "sluggish" so that a greater voltage must be applied to it to obtain the same mechanical response as the "average" actuator in the array. Under these circumstances the contact at 52 would be displaced toward the right to increase the voltage to be applied to the actuator to compensate for this sluggishness. Should the actuator be more highly responsive than required, the adjustable contact 6 would be moved to the left to reduce the applied voltage, to compensate for this fact. Thus it should be appreciated that actuators having various degrees of responsiveness to a particular voltage may be employed in the array without detrimental effects, and as a result, tight manufacturing tolerances are unnecessary to reduce costs. Also the application of particular control voltages to a large number of actuators has been eliminated in accordance with the invention since only one voltage gradient need be applied across the resistive mat. Because of this calibration feature, the resistive mat itself need not be necessarily homogenous, and any non linearity with respect to the voltage potential along the length of the mat may be automatically compensated for by the process of selecting the appropriate particular point of contact with the mat. While a precision network of individual resistors could be employed, a continuous mat having an infinite number of "pickoff" points is preferred.

It should be apparent that the teachings above may be expanded whereby a single potential gradient may be applied across the mat in any given direction, to enable changing the direction of mirror tilt. For example, a circular mat may be provided, and the potentials may be applied at diametrically opposite edges of the mat to establish the axis of rotation of the mirror as explained above in connection with the prior art array of FIG. 2. A single pair of diametrically opposite movable slip contacts could be provided, whereby such contacts function as brushes to establish the direction of the potential gradient across the circular mat. Alternatively, a substantial number of pairs of permanent contacts could be employed, where one selected pair at a time is energized.

While particular embodiments of the present invention have been shown and described, it is apparent that various changes and modifications may be made, and it is therefore intended that the following claims cover all such modifications and changes as may fall within the true spirit and scope of the invention. For example, the number of groups of actuators and the number of actuators in each group may vary widely.

I claim:

1. In a tip-tilt control system for selectively controlling the orientation of an optical element having a central portion:
   a plurality of electromechanical actuators, each having an input circuit, said actuators being coupled to said optical element for displacing a portion thereof by amounts proportional to voltages applied to the input circuits of said actuators;
   a two-dimensional impedance network;
   a control voltage source for producing voltage gradients across said network; and
   means for adjustably coupling the input circuit of each actuator to various points upon said impedance network until particular points are found for producing displacement of the optical element for a given voltage gradient applied across said network without inducing bending stresses in said optical element.

2. The combination as set forth in claim 1, wherein said voltage source includes means for applying a positive voltage to a first portion of said network and a negative voltage to a second portion of said network.

3. The combination as set forth in claim 1, wherein said optical element comprises a mirror.

4. The combination as set forth in claim 2, wherein said optical element comprises a mirror.

5. In a tip-tilt control system for selectively controlling the orientation of an optical element having a central portion:
   a plurality of electromechanical actuators, each having an input circuit, said actuators being coupled to said optical element for displacing a portion thereof by amounts proportional to voltages applied to the input circuits of said actuators;
   a two-dimensional resistive mat;
   a control voltage source for producing voltage gradients across said mat; and
   means for adjustably coupling the input circuit of each actuator to various points upon said resistive mat until particular points are found for producing displacement of the optical element for a given voltage gradient applied across said mat without inducing bending stresses in said optical element.

6. The combination as set forth in claim 5, wherein said voltage source includes means for applying a positive voltage to a first portion of said network and a negative voltage to a second portion of said network.

7. The combination as set forth in claim 5, wherein said optical element comprises a mirror.

8. The combination as set forth in claim 6, wherein said optical element comprises a mirror.

9. A method for controlling the orientation of an optical element having a central portion:
   providing a plurality of electromechanical actuators coupled to said optical element for displacing portions thereof by amounts proportional to the voltages applied thereto along with a two dimensional impedance network;
   applying a voltage gradient across said network;
   coupling the first input terminals of each electromechanical actuator to various points upon said network until particular points are found for each actuator for producing movement of each actuator for a given voltage applied across said mat without inducing bending stresses in said optical element; and
   coupling the second input terminals of each actuator to a reference voltage point.

10. The method as set forth in claim 9, wherein a positive voltage is applied to one portion of said network and a negative voltage is applied to a second portion of said network.

11. The method as set forth in claim 10, wherein said positive voltage is applied to a first edge portion of said network and said negative voltage is applied to a second edge portion widely separated from said first edge portion.

12. A method for controlling the orientation of a tip-tilt mirror having a central portion:
   providing a plurality of electromechanical actuators coupled to said element for displacing portions thereof by amounts proportional to the voltages applied to said actuators along with a two-dimensional resistive mat;
   applying a voltage gradient across said network;
   coupling the first input terminals of each electromechanical actuator to various points upon said network until particular points are found for each actuator for producing movement of each actuator for a given voltage gradient applied across said mat without inducing bending stresses in said optical element; and
   coupling the second input terminals of each actuator to a reference voltage point.

13. The method as set forth in claim 12, wherein a positive voltage is applied to one portion of said network and a negative voltage is applied to a second portion of said network.

14. The method as set forth in claim 13, wherein said positive voltage is applied to a first edge portion of said network and said negative voltage is applied to a second edge portion widely separated from said first edge portion.

* * * * *